(12) United States Patent
Chandak et al.

(10) Patent No.: US 11,142,597 B2
(45) Date of Patent: *Oct. 12, 2021

(54) POLYETHYLENE COMPOSITION

(71) Applicant: Univation Technologies, LLC, Houston, TX (US)

(72) Inventors: Swapnil B. Chandak, Pearland, TX (US); Nitin Borse, Lake Jackson, TX (US); Ayush A. Bafna, Manvel, TX (US); Yi Zhang, South Charleston, WV (US); Timothy R. Lynn, Glen Gardner, NJ (US); Roger L. Kuhlman, Lake Jackson, TX (US); John F. Szul, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/346,245

(22) PCT Filed: Oct. 25, 2017

(86) PCT No.: PCT/US2017/058232
§ 371 (c)(1),
(2) Date: Apr. 30, 2019

(87) PCT Pub. No.: WO2018/089194
PCT Pub. Date: May 17, 2018

(65) Prior Publication Data
US 2019/0256629 A1 Aug. 22, 2019

Related U.S. Application Data

(60) Provisional application No. 62/503,007, filed on May 8, 2017, provisional application No. 62/418,913, filed on Nov. 8, 2016.

(51) Int. Cl.
*C08F 210/02* (2006.01)
*C08F 210/16* (2006.01)
(Continued)

(52) U.S. Cl.
CPC ........ *C08F 210/16* (2013.01); *C08F 4/64148* (2013.01); *C08F 4/65927* (2013.01);
(Continued)

(58) Field of Classification Search
CPC ... C08F 210/15; C08F 2500/05; C08F 210/16
See application file for complete search history.

(56) References Cited

U.S. PATENT DOCUMENTS 3,324,095 A 6/1967 Carrick et al.
3,709,853 A 1/1973 Karapinka
(Continued)

FOREIGN PATENT DOCUMENTS

BE 839380 9/1976
CA 2427685 6/2002
(Continued)

OTHER PUBLICATIONS

Janzen, J., et. al., "Diagnosing long-chain branching in polyethylenes," Journal of Molecular Structure, 1999, p. 569-584, vol. 485-486, Elsevier.
(Continued)

*Primary Examiner* — Rip A Lee

(57) ABSTRACT

A bimodal linear polyethylene composition, products made therefrom, methods of making and using same, and articles containing same.

12 Claims, 2 Drawing Sheets

Figure 1:
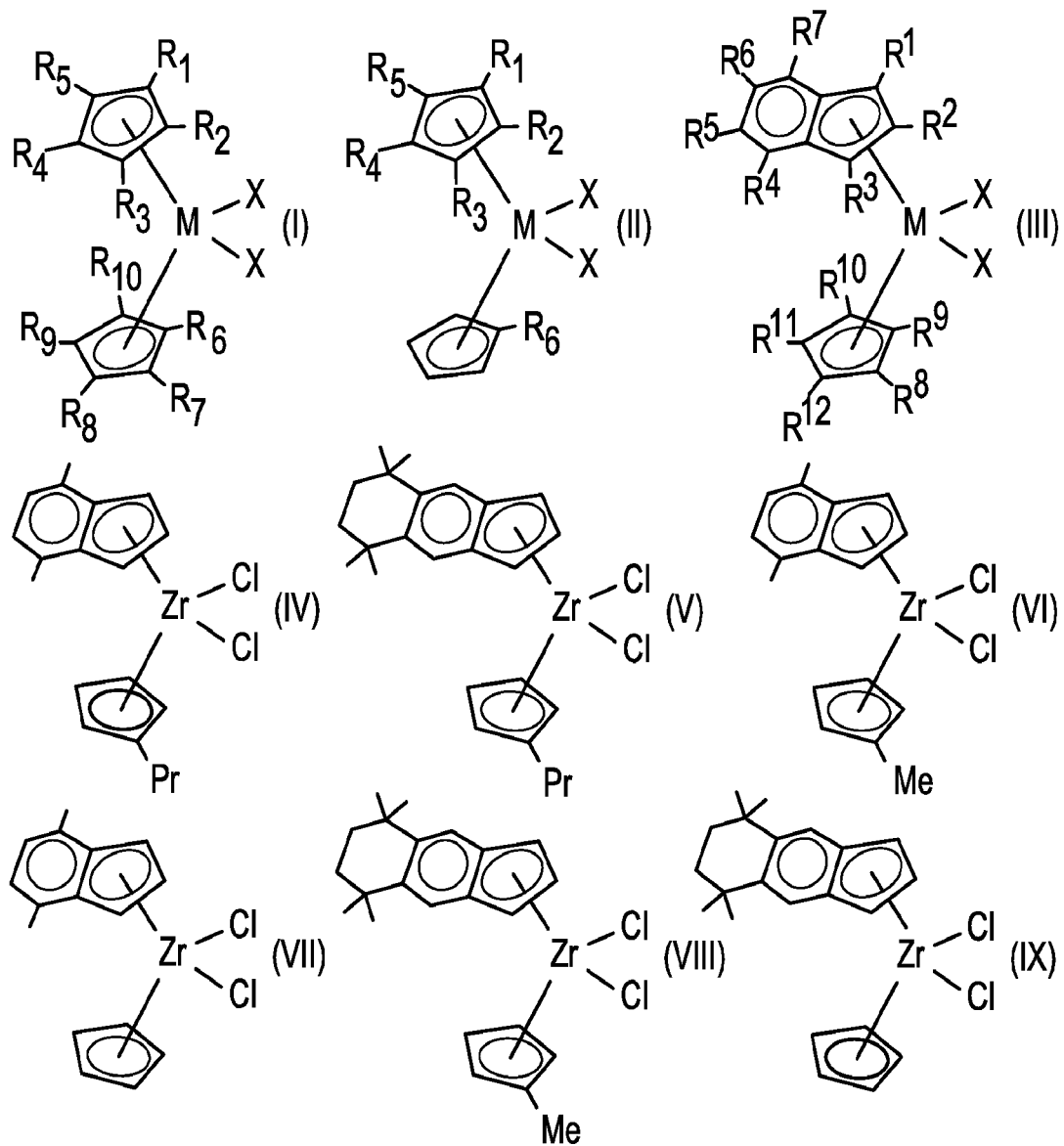
Figure 1:
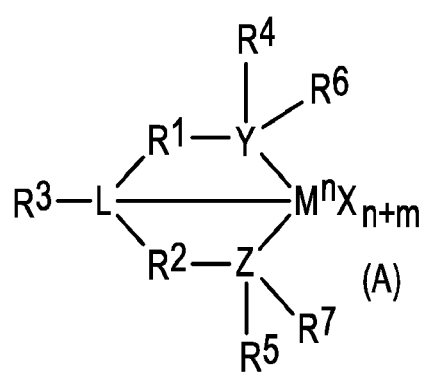
Figure 1:
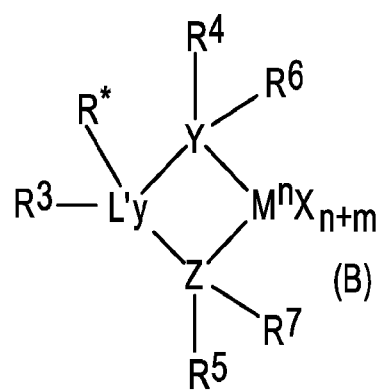

(51) Int. Cl.
  *C08F 4/64*      (2006.01)
  *C08F 4/6592*    (2006.01)
  *C08F 10/02*     (2006.01)
  *C08L 23/08*     (2006.01)
  *C08F 10/00*     (2006.01)

(52) U.S. Cl.
  CPC .............. *C08F 10/00* (2013.01); *C08F 10/02* (2013.01); *C08F 210/02* (2013.01); *C08L 23/0815* (2013.01); *C08F 2500/05* (2013.01); *C08F 2500/12* (2013.01); *C08F 2500/26* (2013.01); *C08L 2205/025* (2013.01); *C08L 2207/06* (2013.01); *C08L 2308/00* (2013.01); *C08L 2314/06* (2013.01)

(56) References Cited

U.S. PATENT DOCUMENTS

| | | |
|---|---|---|
| 4,003,712 A | 1/1977 | Miller |
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins, III et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,489,408 B2 | 12/2002 | Mawson et al. |
| 6,534,604 B2 | 3/2003 | Loveday et al. |
| 6,828,395 B1 | 12/2004 | Ehrman et al. |
| 7,193,017 B2 | 3/2007 | Kwalk |
| 7,312,279 B2 | 12/2007 | Kwalk |
| 7,576,166 B2 | 8/2009 | Aarila et al. |
| 7,858,702 B2 | 12/2010 | Jaker |
| 7,868,092 B2 | 1/2011 | Kwalk et al. |
| 7,897,710 B2 | 3/2011 | Amos et al. |
| 8,008,403 B2 | 8/2011 | Kipke et al. |
| 8,202,940 B2 | 6/2012 | Jaker et al. |
| 8,378,029 B2 | 2/2013 | Liu et al. |
| 8,703,884 B2* | 4/2014 | Mariott .................. C08F 210/14 526/60 |
| 8,846,188 B2 | 9/2014 | Fantinel et al. |
| 8,957,158 B2 | 2/2015 | Fantinel et al. |
| 9,079,993 B1 † | 7/2015 | St. Jean |
| 9,090,762 B2 | 7/2015 | Kipke et al. |
| 9,102,821 B2 † | 8/2015 | Yang |
| 9,284,389 B2 | 3/2016 | St. Jean et al. |
| 9,309,338 B2 | 4/2016 | St. Jean et al. |
| 9,637,567 B2* | 5/2017 | Mariott .................. C08F 4/7042 |
| 9,938,361 B2* | 4/2018 | Lynn ..................... C08F 110/02 |
| 2005/0085600 A1 | 4/2005 | Ehrman et al. |
| 2006/0173123 A1 | 8/2006 | Yang et al. |
| 2012/0065346 A1 | 3/2012 | Nozue et al. |
| 2016/0032027 A1 | 2/2016 | St. Jean et al. |
| 2016/0102161 A1 † | 4/2016 | Cruz |
| 2020/0048384 A1* | 2/2020 | Martin .................. C08F 4/6592 |
| 2020/0071509 A1* | 3/2020 | Borse ..................... C08F 10/02 |
| 2021/0095109 A1 | 4/2021 | Chandak et al. |

FOREIGN PATENT DOCUMENTS

| | | |
|---|---|---|
| EP | 794200 A2 | 9/1997 |
| EP | 634421 B1 | 10/1997 |
| EP | 802202 | 10/1997 |
| EP | 1764378 B1 | 3/2009 |
| EP | 1809675 B1 | 4/2013 |
| WO | 2006045738 | 5/2006 |
| WO | 2010008964 | 1/2010 |
| WO | 2010034520 | 4/2010 |
| WO | 2015069637 A2 | 5/2015 |
| WO | 2016008682 A1 † | 1/2016 |

OTHER PUBLICATIONS

Hieber, C.A., et. al. "Shear-Rate-Dependence Modeling of Polymer Melt Viscosity," Polymer Engineering and Science, 1992, p. 931-938, vol. 32, No. 14.

Bird, R.B., et. al., "Dynamics of Polymeric Liquids," 1987, Fluid Mechanics, vol. 1, 2nd Edition, John Wiley & Sons.

Hieber, C.A., et. al. "Some correlations involving the shear viscosity of polystyrene melts," Rheologica Acta, 1989, p. 321-332, vol. 28, No. 4.

\* cited by examiner
† cited by third party

POLYETHYLENE COMPOSITION

FIELD

Polyethylene compositions, products, methods, and articles.

INTRODUCTION

Linear low density polyethylene ("LLDPE") is compositionally distinct from low density polyethylene ("LDPE") and has certain superior properties that have led it to replace LDPE in a number of commercial applications. These include films, sheets, and injection molded articles. LLDPE films and sheets are used in packaging applications and non-packaging applications. Examples are agricultural film, food packaging, garment bags, grocery bags, heavy-duty sacks, industrial sheeting, pallet and shrink wraps, and bags. LLDPE injection molded articles include buckets, freezer containers, lids, and toys.

Polyethylenes are mentioned in CA 2427685 A1; U.S. Pat. Nos. 7,576,166 B2; 7,897,710 B2; 8,008,403 B2; 8,846,188 B2; 8,957,158 B2; 9,090,762 B2; 9,284,389 B2; 9,309,338 B2; WO 2006/045738 A1; and WO 2015/069637 A2.

U.S. Pat. No. 7,576,166 B2 to J. Äärllä et al. relates to a process for the production of linear low-density polyethylene composition. A process for producing bimodal linear low-density polyethylene polymer compositions, useful for making films. Exemplifies Ziegler-Natta catalyst.

U.S. Pat. Nos. 8,846,188 B2 and 8,957,158 B2, both to F. Fantinel et al., relate to impact resistant LLDPE composition and films made thereof. The polyethylene is produced in one (single) gas phase reactor.

WO 2015/069637 A2 to A. M. Sukhadia relates to low density polyolefin resins with low molecular weight and high molecular weight components, and films made therefrom. Ethylene-based polymers produced using dual metallocene catalyst systems.

SUMMARY

We recognized a problem that hurts the manufacturing, use, and performance of prior LLDPEs made with metallocene catalyst ("prior MCN-LLDPE"). The problem also hurts the manufacturing, use, and performance of prior blends comprising a prior LLDPE made with Ziegler-Natta catalyst and the prior MCN-LLDPE. For example, relative to processability of prior LLDPEs made with Ziegler-Natta catalyst ("prior ZN-LLDPE"), prior MCN-LLDPEs have inferior processability. For example during extrusion of the prior MCN-LLDPE, the extruder barrel pressure is higher than during extrusion of prior ZN-LLDPE. Also, prior MCN-LLDPEs may have insufficient sealability (e.g., hot seal/hot tack may be too weak) relative to prior ZN-LLDPE. Other processability drawbacks of prior MCN-LLDPEs may include tan delta values that are too high, molecular weight distributions (MWD) that are too narrow, and shear thinning index values that are too low. Prior MCN-LLDPEs also may have insufficient stiffness or other mechanical properties that are not sufficient for certain applications. For example, for certain uses Elmendorf tear in the cross direction (CD Tear) or machine direction (MD Tear) may be too likely, melt strength may be too low, secant modulus may be too low, and/or dart impact strength may be too low. The prior blend has dart impact property that is worse (lower) than that of the prior MCN-LLDPE alone. The more prior ZN-LLDPE that is mixed with the prior MCN-LLDPE, the worse the dart impact property of the blend gets.

A technical solution to this problem was not obvious from the prior art. A problem to be solved by inventiveness then is to discover a new LMDPE that alone has at least one processability characteristic similar to that of an unblended monomodal ZN-LMDPE and at least one stiffness/mechanical property similar to that of an unblended monomodal MCN-LMDPE.

Our technical solution to this problem includes a bimodal linear medium density polyethylene composition ("inventive bimodal LMDPE composition") made with a bimodal catalyst system, products made therefrom, methods of making and using same, and articles containing same. The inventive bimodal LMDPE has a combination of improved properties comprising at least one processability characteristic similar to that of an unblended monomodal ZN-LMDPE and a dart impact property similar to that of an unblended monomodal MCN-LMDPE. In some aspects the inventive bimodal LMDPE composition is characterized by a density from 0.9000 to 0.9500 gram per cubic centimeter (g/cm³), alternatively from 0.930 to 0.950 g/cm³, measured according to ASTM D792-13 Method B.

The inventive bimodal LMDPE may be characterized by at least one improved (increased) property. The improvement may be relative to that of a prior bimodal LMDPE.

The inventive bimodal LMDPE may be used in a number of industrial applications.

DRAWINGS

FIG. 1 contains drawings of structural formulas of (pro) catalysts.

Figure 2:
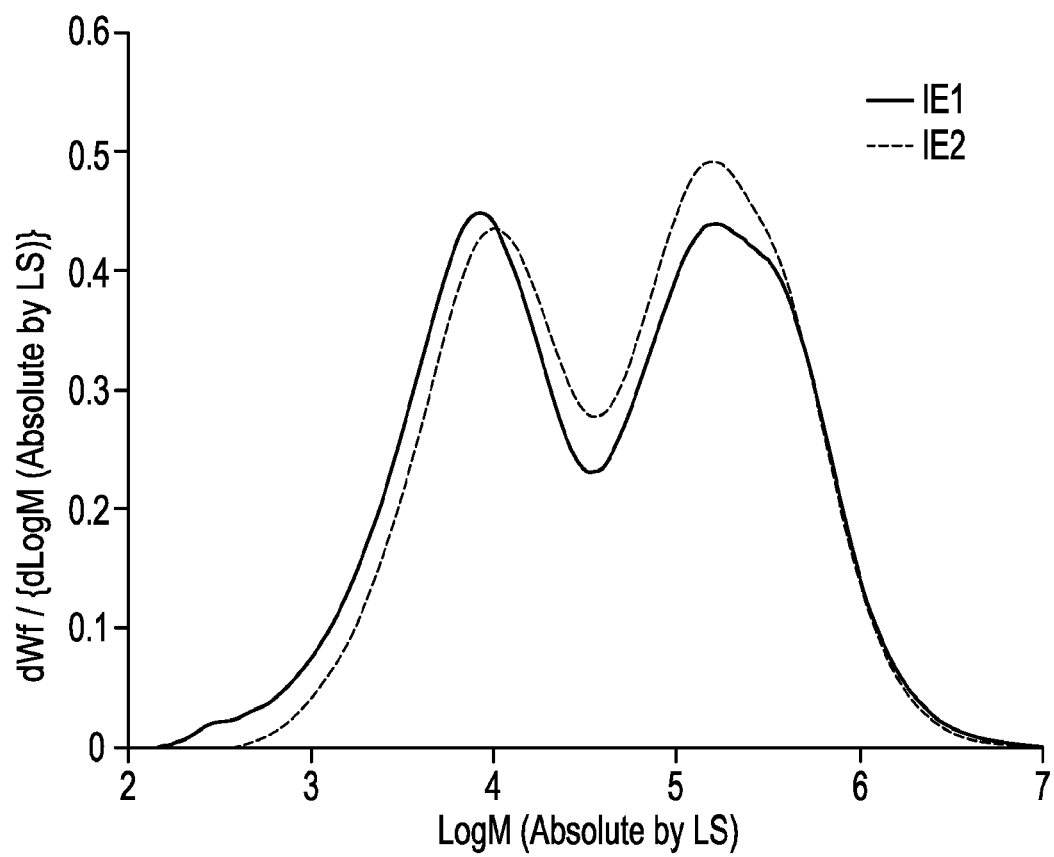

FIG. 2 is a GPC chromatogram of inventive example 1 of the inventive bimodal LMDPE composition.

DETAILED DESCRIPTION

The Summary and Abstract are incorporated here by reference.

Unpredictably, the inventive bimodal LMDPE composition has at least one improved property such as, for example, at least one improved (increased) processability property and/or at least one improved (increased) stiffness property. The improved processability property may be at least one of decreased extruder barrel pressure, increased sealability (e.g., hot seal/hot tack), decreased tan delta value, and increased shear thinning index value. The improved stiffness property may be at least one of increased Elmendorf tear (CD Tear and/or MD Tear), increased melt strength, increased secant modulus, and increased dart impact strength. In some aspects the inventive bimodal LMDPE composition is not characterized by a worsening of any three, alternatively any two, alternatively any one of the foregoing properties. The inventive bimodal LMDPE composition may be used to make films, sheets and injection molded articles.

Certain inventive embodiments are described below as numbered aspects for easy cross-referencing. Additional embodiments are described elsewhere herein.

Aspect 1. A bimodal linear medium density polyethylene composition comprising a lower molecular weight (LMW) polyethylene component and a higher molecular weight (HMW) polyethylene component, wherein each of the LMW and HMW polyethylene components comprises ethylene-derived monomeric units and ($C_3$-$C_{20}$)alpha-olefin-derived comonomeric units; and wherein the bimodal linear medium density polyethylene composition is characterized by each of limitations (a) to (d): (a) a resolved bimodality (resolved molecular weight distribution) showing in a chromatogram of gel permeation chromatography (GPC) of the bimodal linear medium density polyethylene composition, wherein the chromatogram shows a peak representing the HMW polyethylene component, a peak representing the LMW polyethylene component, and a local minimum in a range of Log(molecular weight) ("Log(MW)") 1.5 to 5.0, alternatively 2.5 to 5.0, alternatively 3.5 to 4.5, alternatively 4.0 to 4.5 (e.g., Log(MW) is 4.05 to 4.25) between the peak representing the HMW polyethylene component and the peak representing the LMW polyethylene component, measured according to the Bimodality Test Method, described later; (b) a molecular mass dispersity ($M_w/M_n$), $Đ_M$ (pronounced D-stroke M), from 5 to 30.1, alternatively from 7 to 25, alternatively from 10.1 to 20.1, all measured according to the Gel Permeation Chromatography (GPC) Test Method, described later; (c) no measurable, alternatively no detectable, amount of long chain branching per 1,000 carbon atoms ("LCB Index"), measured according to LCB Test Method (described later); and (d) a density from 0.930 to 0.950 gram per cubic centimeter (g/cm$^3$), alternatively 0.9301 to 0.9450 g/cm$^3$, alternatively 0.9300 to 0.9380 g/cm$^3$, alternatively 0.9400 to 0.950 g/cm$^3$, alternatively 0.9450 to 0.9499 g/cm$^3$, all measured according to ASTM D792-13 Method B.

Aspect 2. The bimodal LMDPE composition of aspect 1 further described by any one of limitations (i) to (iii): (i) a melt index (190° C., 2.16 kilograms (kg), "MI$_2$") from 0.1 to 5.0 grams per 10 minutes (g/10 min.), alternatively 0.1 to 3.0 g/10 min., alternatively 0.1 to 2.0 g/10 min., alternatively 0.1 to 1.0 g/10 min., alternatively from 0.1 to 0.5 g/10 min., all measured according to the Melt Index MI$_2$ Test Method, described later; (ii) a tan delta (tan δ) from 5 to 35, alternatively from 5 to 25, alternatively from 5 to 15, alternatively from 8 to 12, alternatively from 9 to 10, all measured at 190° C. and 0.1000 radians per second (rad/s) according to Tan Delta Test Method, described later; (iii) both (i) and (ii).

Aspect 3. The bimodal LMDPE composition of aspect 1 further described by any one of limitations (i) to (iii): (i) a melt index (190° C., 2.16 kilograms (kg), "MI$_2$") from 0.1 to 5.0 grams per 10 minutes (g/10 min.), alternatively 0.1 to 3.0 g/10 min., alternatively 0.1 to 2.0 g/10 min., alternatively 0.1 to 1.0 g/10 min., alternatively from 0.1 to 0.5 g/10 min., all measured according to the Melt Index MI$_2$ Test Method, described later; (ii) a molecular mass dispersity ($M_w/M_n$), $Đ_M$, of at least one of the LMW and HMW polyethylene components of from >2.0 to <3.0, alternatively a $M_w/M_n$ of the LMW polyethylene component from >2.0 to <3.0, alternatively a $M_w/M_n$ of the LMW polyethylene component from >2.0 to <3.0 and a $M_w/M_n$ of the HMW polyethylene component from >3.0 to 3.5, all measured according to the GPC Test Method, described later, after deconvoluting the LMW and HMW polyethylene components of the bimodal LMDPE composition according to the Deconvoluting Test Method, described later; (iii) both (i) and (ii).

Aspect 4. The bimodal LMDPE composition of any one of aspects 1 to 3 further described by any one of limitations (i) to (xii): (i) a flow index (190° C., 21.6 kg, "FI$_{21}$") from 4 to 500 g/10 min., alternatively from 10 to 100 g/10 min., alternatively from 20 to 40 g/10 min., alternatively from 31.0 to 34.0 g/10 min., all measured according to the Flow Index FI$_{21}$ Test Method, described later; (ii) a melt flow ratio (190° C., "MI$_{21}$/MI$_2$") 20.0 to 50.0, alternatively from 24 to 39, alternatively from 25 to 35 and calculated according to the Melt Flow Ratio Test Method, described later; (iii) a shear thinning index value from 1.5 to 10, alternatively from 2.5 to 10.0, alternatively from 3.0 to 10.0, alternatively from 3.1 to 5.0, measured according to the Shear Thinning Index Test Method, described later; (iv) a number-average molecular weight ($M_n$) from 5,000 to 25,000 grams per mole (g/mol), alternatively from 7,000 to 20,001 g/mol, alternatively from 7,001 to 15,000 g/mol, measured according to GPC Test Method, described later; (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 5. The bimodal LMDPE composition of any one of aspects 1 to 4 further described by any one of limitations (i) to (iv): (i) the (C$_3$-C$_{20}$)alpha-olefin-derived comonomeric units are derived from 1-butene; (ii) the (C$_3$-C$_{20}$)alpha-olefin-derived comonomeric units are derived from 1-hexene; (iii) the (C$_3$-C$_{20}$)alpha-olefin-derived comonomeric units are derived from 1-octene; and (iv) the (C$_3$-C$_{20}$)alpha-olefin-derived comonomeric units are derived from a combination of any two, alternatively each of 1-butene, 1-hexene, and 1-octene.

Aspect 6. A bimodal linear medium density polyethylene composition made by copolymerizing ethylene (monomer) and at least one (C$_3$-C$_{20}$)alpha-olefin (comonomer) with a mixture of a bimodal catalyst system and a trim solution in the presence of molecular hydrogen gas (H$_2$) and an inert condensing agent (ICA) in one, two or more polymerization reactors (e.g., one fluidized bed gas phase reactor) under (co)polymerizing conditions; wherein prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dim ethyl) and an inert liquid solvent (e.g., liquid alkane) and the bimodal catalyst system consists essentially of an activator species (derivative, e.g., a methylaluminoxane species), a bis(2-pentamethylphenylamido)ethyl)amine zirconium complex and a (tetramethylcyclopentadienyl)(n-propylcyclopentadienyl)zirconium complex, all disposed on a solid support (e.g., a hydrophobic fumed silica); and wherein the (co)polymerizing conditions comprise a reaction temperature from 80 degrees (°) to 110° Celsius (C.), alternatively 83° to 106° C., alternatively 83° to 87° C., alternatively 91° to 100° C., alternatively 101° to 106° C.; a molar ratio of the molecular hydrogen gas to the ethylene (H2/C2 molar ratio) from 0.001 to 0.020, alternatively 0.002 to 0.015, alternatively 0.005 to 0.010; and a molar ratio of the comonomer (Comer) to the ethylene (Comer/C2 molar ratio) from 0.005 to 0.050, alternatively 0.008 to 0.020, alternatively 0.010 to 0.015. The bimodal LMDPE composition may be that of any one of aspects 1 to 5.

Aspect 7. A method of making a bimodal linear medium density polyethylene composition, the method comprising contacting ethylene (monomer) and at least one (C$_3$-C$_{20}$) alpha-olefin (comonomer) with a mixture of a bimodal catalyst system and a trim solution in the presence of molecular hydrogen gas (H$_2$) and an inert condensing agent (ICA) in one, two or more polymerization reactors under (co)polymerizing conditions, thereby making the bimodal linear medium density polyethylene composition; wherein prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dimethyl) and an inert liquid solvent (e.g., liquid alkane) and the bimodal catalyst system consists essentially of an activator species (derivative, e.g., a methylaluminoxane species), a non-metallocene ligand-Group 4 metal complex (e.g., bis(2-pentamethylphenylamido)ethyl)amine zirconium complex) and a metallocene ligand-Group 4 metal complex (e.g., (tetramethylcyclopentadienyl)(n-propylcyclopentadienyl)zirconium complex), all disposed on a solid support (e.g., a hydrophobic fumed silica); and wherein the (co)polymerizing conditions comprise a reaction temperature from 80 degrees)(° to 110° Celsius (C.), alternatively 83° to 106° C., alternatively 83° to 87° C., alternatively 91° to 100° C., alternatively 101° to 106° C.; a molar ratio of the molecular hydrogen gas to the ethylene (H2/C2 molar ratio) from 0.001 to 0.050, alternatively 0.001 to 0.030, alternatively 0.002 to 0.025, alternatively 0.010 to 0.020; and a molar ratio of the comonomer (Comer) to the ethylene (Comer/C2 molar ratio) from 0.005 to 0.10, alternatively 0.008 to 0.050, alternatively 0.010 to 0.040 alternatively 0.008 to 0.020, alternatively 0.010 to 0.015. The bimodal LMDPE composition may be that of any one of aspects 1 to 6. In an alternative embodiment of aspect 6 or 7, the bimodal catalyst system may be prepared, and then fed into the polymerization reactor(s) as a suspension (e.g., slurry) in a mineral oil and the trim solution may be prepared, and then fed into the polymerization reactor(s) as a solution, e.g., in a liquid alkane.

Aspect 8. The bimodal linear medium density polyethylene composition of aspect 6 or the method of aspect 7 may be further described by any one of limitations (i) to (vi): (i) wherein the bimodal catalyst system consists essentially of a bis(2-pentamethylphenylamido)ethyl)amine zirconium complex and a (tetramethylcyclopentadienyl)(n-propylcyclopentadienyl)zirconium complex in a molar ratio thereof from 1.0:1.0 to 5.0:1.0, respectively, alternatively 1.5:1.0 to 2.5:1.0, alternatively 2.0:1.0 to 4.0:1.0, 2.5:1.0 to 3.49:1.0, alternatively from 2.7:1.0 to 3.3:1.0, alternatively from 2.9:1.0 to 3.1:1.0, alternatively 1.5:1.0, alternatively 2.0:1.0, and a methylaluminoxane species, all disposed by spray-drying onto the solid support; (ii) wherein the bimodal catalyst system further consists essentially of mineral oil and the solid support is a hydrophobic fumed silica (e.g., a fumed silica treated with dimethyldichlorosilane); (iii) wherein the mixture is a suspension of the bimodal catalyst system in mineral oil and the trim solution and wherein the mixture is premade and then fed into the polymerization reactor(s); (iv) wherein the trim solution is made by dissolving (tetramethylcyclopentadienyl)(n-propylcyclopentadienyl)zirconium dimethyl in the inert liquid solvent (e.g., liquid alkane) to give the trim solution; (v) wherein the polymerization reactor(s) is one fluidized bed gas phase reactor and the method is a gas phase polymerization; and (vi) each of (i) to (v). The molar ratio of the bis(2-pentamethylphenylamido)ethyl)amine zirconium complex to the (tetramethylcyclopentadienyl)(n-propylcyclopentadienyl) zirconium complex may be based on molar ratio of their respective Zr atom contents, which may be calculated from ingredient weights (e.g., weights of bis(2-pentamethylphenylamido)ethyl)amine zirconium dibenzyl and (tetramethylcyclopentadienyl)(n-propylcyclopentadienyl)zirconium dichloride) or may be analytically measured.

Aspect 9. A manufactured article comprising a shaped form of the bimodal linear medium density polyethylene composition of any one of aspects 1 to 6.

Aspect 10. The manufactured article of aspect 9 selected from: coatings, films, sheets, extruded articles, and injection molded articles. The manufactured article may be a film, alternatively a blown film.

Aspect 11. The manufactured article of aspect 9 or 10 selected from a coated metal pipe (e.g., a coated steel pipe), agricultural film, food packaging, garment bags, grocery bags, heavy-duty sacks, industrial sheeting, pallet and shrink wraps, bags, buckets, freezer containers, lids, and toys. The coated metal (e.g., steel) pipe comprises a conduit (e.g., a cylindrical wall) and a coating disposed thereon, wherein the conduit is composed of a metal or metal alloy (e.g., steel, which is an alloy of iron containing about 1% carbon) and defines proximal and distal openings and an interior surface and an exterior surface spaced apart from the interior surface by a thickness of the conduit (e.g., thickness of the cylindrical wall), wherein the interior surface of the conduit defines a volumetric space therein and wherein the coating at least partially covers the interior surface and/or exterior surface of the conduit and wherein the coating comprises the bimodal linear medium density polyethylene composition.

Aspect 12. A method of covering a substance or article in need of covering, the method comprising covering or sealing, alternatively sealing at least a portion, alternatively all of the substance or the manufactured article of any one of aspects 9 to 11.

Activator (for activating procatalysts to form catalysts). Also known as co-catalyst. Any metal containing compound, material or combination of compounds and/or substances, whether unsupported or supported on a support material, that can activate a procatalyst to give a catalyst and an activator species. The activating may comprise, for example, abstracting at least one leaving group (e.g., at least one X in any one of the structural formulas in FIG. 1) from a metal of a procatalyst (e.g., M in any one of the structural formulas in FIG. 1) to give the catalyst. The catalyst may be generically named by replacing the leaving group portion of the name of the procatalyst with "complex". For example, a catalyst made by activating bis(2-pentamethylphenylamido) ethyl)amine zirconium dibenzyl may be called a "bis(2-pentamethylphenylamido)ethyl)amine zirconium complex". A catalyst made by activating (tetramethylcyclopentadienyl)(n-propylcyclopentadienyl)zirconium dichloride or (tetramethylcyclopentadienyl)(n-propylcyclopentadienyl)zirconium dimethyl may be called a "(tetramethylcyclopentadienyl)(n-propylcyclopentadienyl) zirconium complex". The catalyst made by activating (tetramethylcyclopentadienyl)(n-propylcyclopentadienyl)zirconium dichloride may be the same as or different than the catalyst made by activating (tetramethylcyclopentadienyl) (n-propylcyclopentadienyl)zirconium dimethyl. The metal of the activator typically is different than the metal of the procatalyst. The molar ratio of metal content of the activator to metal content of the procatalyst(s) may be from 1000:1 to 0.5:1, alternatively 300:1 to 1:1, alternatively 150:1 to 1:1. The activator may be a Lewis acid, a non-coordinating ionic activator, or an ionizing activator, or a Lewis base, an alkylaluminum, or an alkylaluminoxane. The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, triisobutylaluminum, and the like. The alkylaluminum halide may be diethylaluminum chloride. The alkylaluminoxane may be a methyl aluminoxane (MAO), ethyl aluminoxane, or isobutylaluminoxane. The activator may be a MAO that is a modified methylaluminoxane (MMAO). The corresponding activator species may be a derivative of the Lewis acid, non-coordinating ionic activator, ionizing activator, Lewis base, alkylaluminum, or alkylaluminoxane, respectively. The activator species may have a different structure or composition than the activator from which it is derived and may be a byproduct of the activation of the procatalyst or a derivative of the byproduct. An example of the derivative of the byproduct is a methylaluminoxane species that is formed by devolatilizing during spray-drying of a bimodal catalyst system made with methylaluminoxane. The activator may be commercially available. An activator may be fed into the polymerization reactor(s) (e.g., one fluidized bed gas phase reactor) in a separate feed from that feeding the reactants used to make the bimodal catalyst system (e.g., supported bimodal catalyst system) and/or the trim solution thereinto. The activator may be fed into the polymerization reactor(s) in "wet mode" in the form of a solution thereof in an inert liquid such as mineral oil or toluene, in slurry mode as a suspension, or in dry mode as a powder.

Bimodal. Multimodal; having at least 2 peaks, (e.g., 2 or 3 peaks), alternatively only 2 peaks, in a molecular weight distribution (MWD) such as MWD measured by gel permeation chromatography (GPC).

Bimodal catalyst system. A combination of two or more catalyst compounds independently useful for enhancing rate of polymerization of a same olefin monomer and/or comonomer and yields a bimodal polyethylene composition. In some aspects the bimodal catalyst system has only two catalysts, and is prepared from two and only two procatalyst compounds. One of the catalyst compounds may be a metallocene catalyst compound and the other a non-metallocene catalyst compound. One of the catalyst compounds yields, under the (co)polymerizing conditions, the lower molecular weight (LMW) polyethylene component and the other catalyst compound yields the higher molecular weight (HMW) polyethylene component. The LMW and HMW polyethylene components together constitute the bimodal polyethylene composition, which may be the inventive LMDPE composition, made with the bimodal catalyst system, and having a multimodal (e.g., bimodal) molecular weight distribution. Typically the bimodal catalyst system, method employing same, and inventive bimodal LMDPE composition is free of a Ziegler-Natta catalyst.

The bimodal catalyst system may be made by contacting at least two procatalysts having different structures from each other with at least one of the activators. Each procatalyst may independently comprise a metal atom, at least one ligand bonded to the metal atom, and at least one leaving group bonded to and displaceable from the metal atom. Each metal may be an element of any one of Groups 3 to 14, e.g., a Group 4 metal. Each leaving group is H, an unsubstituted alkyl, an aryl group, an aralkyl group, a halide atom, an alkoxy group, or a primary or secondary amino group. In metallocenes, at least one ligand is a cyclopentadienyl or substituted cyclopentadienyl group. In non-metallocenes, no ligand is a cyclopentadienyl or substituted cyclopentadienyl group, and instead at least one ligand has at least one O, N, and/or P atom that coordinates to the metal atom. Typically the ligand(s) of the non-metallocene has at least two O, N, and/or P atoms that coordinates in a multidentate (e.g., bidentate or tridentate) binding mode to the metal atom. Discrete structures means the procatalysts and catalysts made therefrom have different ligands from each other, and either the same or a different metal atom, and either the same or different leaving groups.

One of the procatalysts, useful for making a catalyst of the bimodal catalyst system and/or making the trim solution, may be a metallocene compound of any one of formulas (I) to (IX) and another of the procatalysts may be a non-metallocene of any one of formulas (A) and (B), wherein the formulas are drawn in FIG. 1.

In formula (I), FIG. 1, each of the $R^1$ to $R^{10}$ groups is independently H, a $(C_1-C_{20})$alkyl, $(C_6-C_{20})$aryl, or $(C_7-C_{20})$aralkyl group; M is a Group 4 metal; and each X is independently H, a halide, $(C_1-C_{20})$alkyl, or $(C_7-C_{20})$aralkyl group. In some aspects each of $R^7$ to $R^{10}$ is H.

In formula (II), FIG. 1, each of the $R^1$ to $R^6$ groups is independently H, a $(C_1-C_{20})$alkyl, $(C_6-C_{20})$aryl, or $(C_7-C_{20})$aralkyl group; M is a Group 4 metal (e.g., Ti, Zr, or Hf); and each X is independently H, a halide, $(C_1-C_{20})$alkyl, or $(C_7-C_{20})$aralkyl group.

In formula (III), FIG. 1, each of the $R^1$ to $R^{12}$ groups is independently H, a $(C_1-C_{20})$alkyl, $(C_6-C_{20})$aryl, or $(C_7-C_{20})$aralkyl group, wherein at least one of $R^4$ to $R^7$ is not H; M is a Group 4 metal (e.g., Ti, Zr, or Hf); and each X is independently H, a halide, $(C_1-C_{20})$alkyl, or $(C_7-C_{20})$aralkyl group. In some aspects each of $R^9$ to $R^{12}$ is H in formula (III).

In some aspects each X in formulas (I) to (III) is independently a halide, $(C_1-C_4)$alkyl, or benzyl; alternatively Cl or benzyl. In some aspects each halide in formulas (I) to (III) is independently Cl, Br, or I; alternatively Cl or Br; alternatively Cl. In some aspects each M in formulas (I) to (III) is independently Ti, Zr, or Hf; alternatively Zr or Hf; alternatively Ti; alternatively Zr; alternatively Hf.

In formulas (IV) to (IX), FIG. 1, Me is methyl ($CH_3$), Pr is propyl (i.e., $CH_2CH_2CH_3$), and each "I" substituent on a ring represents a methyl group.

In formulas (A) and (B), FIG. 1, M is a Group 3 to 12 transition metal atom or a Group 13 or 14 main group metal atom, or a Group 4, 5, or 6 metal atom. M may be a Group 4 metal atom, alternatively Ti, Zr, or Hf; alternatively Zr or Hf; alternatively Zr. Each X is independently a leaving group as described above, such as an anionic leaving group. Subscript y is 0 or 1; when y is 0 group L' is absent. Subscript n represents the formal oxidation state of metal atom M and is +3, +4, or +5; alternatively n is +4. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus; alternatively nitrogen. Z is a Group 15 element, such as nitrogen or phosphorus; alternatively nitrogen. Subscript m is 0, −1, −2 or −3; alternatively −2; and represents the total formal charge of the Y, Z, and L in formula (A) and the total formal charge of the Y, Z, and L' in formula (B). $R^1$, $R^2$, $R^3$, $R^4$, $R^5$, $R^6$, and $R^7$ are independently H, a $(C_1-C_{20})$hydrocarbyl group, a $(C_1-C_{20})$heterohydrocarbyl group, or a $(C_1-C_{20})$organoheteryl group, wherein the $(C_1-C_{20})$heterohydrocarbyl group and $(C_1-C_{20})$organoheteryl group each independently have at least one heteroatom selected from Si, Ge, Sn, Pb, or P. Alternatively, $R^1$ and $R^2$ are covalently bonded to each other to form a divalent group of formula —$R^{1a}$—$R^{2a}$— and/or $R^4$ and $R^5$ are covalently bonded to each other to form a divalent group of formula —$R^{4a}$—$R^{5a}$—, wherein —$R^{1a}$—$R^{2a}$ and —$R^{4a}$—$R^{5a}$, are independently a $(C_1-C_{20})$hydrocarbylene group, a $(C_1-C_{20})$heterohydrocarbylene group, or a $(C_1-C_{20})$organoheterylene group. $R^3$ may be absent; alternatively $R^3$ is H, a halogen atom, a $(C_1-C_{20})$hydrocarbyl group, a $(C_1-C_{20})$heterohydrocarbyl group, or a $(C_1-C_{20})$organoheteryl group. $R^3$ is absent if, for example, L is O, H, or an alkyl group. $R^4$ and $R^5$ may be a $(C_1-C_{20})$alkyl group, a $(C_6-C_{20})$aryl group, a substituted $(C_6-C_{20})$aryl group, a $(C_3-C_{20})$cycloalkyl group, a substituted $(C_3-C_{20})$cycloalkyl group, a $(C_8-C_{20})$bicyclic aralkyl group, or a substituted $(C_8-C_{20})$bicyclic aralkyl group. $R^6$ and $R^7$ may be H or absent. R* is absent, hydrogen, a group containing Group 14 atom, halogen, or group containing heteroatom.

In some aspects the bimodal catalyst system may comprise a combination of a metallocene catalyst compound and a non-metallocene catalyst compound. The metallocene catalyst compound may be a metallocene ligand-metal complex such as a metallocene ligand-Group 4 metal complex, which may be made by activating (with the activator) a procatalyst compound selected from (pentamethylcyclopentadienyl)(n-propylcyclopentadienyl)zirconium dichloride, bis(n-butylcyclopentadienyl)zirconium dichloride, (pentamethylcyclopentadienyl)(n-propylcyclopentadienyl)zirconium dimethyl, and bis(n-butylcyclopentadienyl)zirconium dimethyl. The non-metallocene catalyst compound may be a non-metallocene ligand-metal complex such as a non-metallocene ligand-Group 4 metal complex, which may be made by activating (with the activator) a procatalyst compound selected from bis(2-(2,4,6-trimethylphenylamido) ethyl)amine zirconium dibenzyl and bis(2-(pentamethylphenylamido)ethyl)amine zirconium dibenzyl.

In some aspects the bimodal catalyst system may be made by activating, according to the method of contacting with an activator, a combination of a metallocene procatalyst compound that is (tetramethylcyclopentadienyl)(n-propylcyclopentadienyl)zirconium dichloride and a non-metallocene procatalyst compound that is bis(2-pentamethylphenylamido)ethyl)amine zirconium dibenzyl. The (tetramethylcyclopentadienyl)(n-propylcyclopentadienyl)zirconium dichloride is a compound of formula (II) wherein M is Zr, each X is Cl, $R^6$ is propyl ($CH_2CH_2CH_3$), and each of $R^1$ to $R^4$ is methyl. The bis(2-pentamethylphenylamido)ethyl) amine zirconium dibenzyl is a procatalyst compound of formula (A) wherein M is Zr, each X is benzyl, $R^1$ and $R^2$ are each $CH_2CH_2$; $R^3$ is H; L, Y, and Z are all N; and $R^4$ and $R^5$ are each pentamethylphenyl; and $R^6$ and $R^7$ are absent.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some aspects the bimodal catalyst system is the bimodal catalyst system described in any one of the following references: U.S. Pat. Nos. 7,193,017 B2; 7,312,279 B2; 7,858,702 B2; 7,868,092 B2; 8,202,940 B2; and 8,378,029 B2 (e.g., column 4/line 60 to column 5/line 10 and column 10/lines 6 to 38 and Example 1).

The bimodal catalyst system may be fed into the polymerization reactor(s) in "dry mode" or "wet mode", alternatively dry mode, alternatively wet mode. The dry mode is fed in the form of a dry powder or granules. The wet mode is fed in the form of a suspension of the bimodal catalyst system in an inert liquid such as mineral oil. The bimodal catalyst system is commercially available under the PRODIGY™ Bimodal Catalysts brand, e.g., BMC-200, from Univation Technologies, LLC.

($C_3$-$C_{20}$)alpha-olefin. A compound of formula (I): $H_2C=C(H)-R$ (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The ($C_3$-$C_{20}$)alpha-olefin is used as a comonomer from which the comonomeric units of the LMW polyethylene component are derived may be the same as, alternatively different than, the ($C_3$-$C_{20}$)alpha-olefin from which the comonomeric units of the HMW polyethylene component are derived.

Consisting essentially of, consist(s) essentially of, and the like. Partially-closed ended expressions that exclude anything that would affect the basic and novel characteristics of that which they describe, but otherwise allow anything else. As applied to the description of a bimodal catalyst system embodiment consisting essentially of bis(2-pentamethylphenylamido)ethyl)amine zirconium dibenzyl and (tetramethylcyclopentadienyl)(n-propylcyclopentadienyl)zirconium dichloride, both disposed on a solid support and activated with an activating agent, the expression means the embodiment does not contain a Ziegler-Natta catalyst or any organic ligand other than the bis(2-pentamethylphenylamido)ethyl) amine, benzyl, tetramethylcyclopentadienyl, and n-propylcyclopentadienyl ligands. One or more of the benzyl and chloride leaving groups may be absent from the Zr in the bimodal catalyst system. The expression "consisting essentially of" as applied to the description of the "trim solution means the trim solution is unsupported (i.e., not disposed on a particulate solid) and is free of a Ziegler-Natta catalyst or any organic ligand other than the tetramethylcyclopentadienyl and n-propylcyclopentadienyl ligands. The expression "consist essentially of" as applied to a dry inert purge gas means that the dry inert purge gas is free of, alternatively has less than 5 parts per million based on total parts by weight of gas of water or any reactive compound that could oxidize a constituent of the present polymerization reaction. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive bimodal LMDPE composition.

At least one, alternatively each of the (co)polymerizing conditions may be fixed (i.e., unchanged) during production of the inventive bimodal LMDPE composition. Such fixed (co)polymerizing conditions may be referred to herein as steady-state (co)polymerizing conditions. Steady-state (co) polymerizing conditions are useful for continuously making embodiments of the inventive bimodal LMDPE composition having same polymer properties.

Alternatively, at least one, alternatively two or more of the (co)polymerizing conditions may be varied within their defined operating parameters during production of the inventive bimodal LMDPE composition in order to transition from the production of a first embodiment of the inventive bimodal LMDPE composition having a first set of polymer properties to a second embodiment of the inventive bimodal LMDPE composition having a second set of polymer properties, wherein the first and second sets of polymer properties are different and are each within the limitations described herein for the inventive bimodal LMDPE composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive bimodal LMDPE composition. At a given molar ratio of comonomer/ethylene, the molar ratio of the procatalyst of the trim solution relative to total moles of catalyst compounds of the bimodal catalyst system may be varied to adjust the density, melt index, melt flow, molecular weight, and/or melt flow ratio thereof. To illustrate an approach to making transitions, perform one of the later described inventive copolymerization examples to reach steady-state (co) polymerizing conditions. Then change one of the (co)polymerizing conditions to begin producing a new embodiment of the inventive bimodal LMDPE composition. Sample the new embodiment, and measure a property thereof. If necessary, repeat the change condition/sample product/measure property steps at intervals until the measurement shows the desired value for the property is obtained. An example of such varying of an operating parameter includes varying the operating temperature within the aforementioned range from 83° to 87° C. such as by changing from a first operating temperature of 85° C. to a second operating temperature of 86° C., or by changing from a third operating temperature of 87° C. to a third operating temperature of 85° C. Similarly, another example of varying an operating parameter includes varying the molar ratio of molecular hydrogen to ethylene (H2/C2) from 0.017 to 0.018, or from 0.020 to 0.019. Similarly, another example of varying an operating parameter includes varying the molar ratio of comonomer (Comer) to the ethylene (Comer/C2 molar ratio) from 0.028 to 0.038, or from 0.041 to 0.025. Combinations of two or more of the foregoing example variations are included herein. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the inventive bimodal LMDPE composition, or the LMW or HMW polyethylene component thereof, may be achieved by a person of ordinary skill in the art in view of the teachings herein.

The (co)polymerizing conditions may further include a high pressure, liquid phase or gas phase polymerization reactor and polymerization method to yield the inventive bimodal LMDPE composition. Such reactors and methods are generally well-known in the art. For example, the liquid phase polymerization reactor/method may be solution phase or slurry phase such as described in U.S. Pat. No. 3,324,095. The gas phase polymerization reactor/method may employ the inert condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the LMW and/or HMW polyethylene components or inventive bimodal LMDPE composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2/\alpha$-olefin) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Dry. Generally, a moisture content from 0 to less than 5 parts per million based on total parts by weight. Materials fed to the polymerization reactor(s) during a polymerization reaction under (co)polymerizing conditions typically are dry.

Ethylene. A compound of formula $H_2C=CH_2$. A polymerizable monomer.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: for claiming purposes, measure properties on 25 micrometers thick monolayer films.

Higher molecular weight (HMW). Relative to LMW, having a higher weight average molecular weight ($M_w$). The HMW polyethylene component of the inventive bimodal LMDPE composition may have an $M_w$ from 10,000 to 1,000,000 g/mol. The lower endpoint of the $M_w$ for the HMW polyethylene component may be 20,000, alternatively 50,000, alternatively 100,000, alternatively 150,000, alternatively 200,000, alternatively 250,000, alternatively 300,000 g/mol. The upper endpoint of $M_w$ may be 900,000, alternatively 800,000, alternatively 700,000, alternatively 600,000 g/mol. In describing the inventive bimodal LMDPE composition, the bottom portion of the range of $M_w$ for the HMW polyethylene component may overlap the upper portion of the range of $M_w$ for the LMW polyethylene component, with the proviso that in any embodiment of the inventive bimodal LMDPE composition the particular $M_w$ for the HMW polyethylene component is greater than the particular $M_w$ for the LMW polyethylene component. The HMW polyethylene component may be made with catalyst prepared by activating a non-metallocene ligand-Group 4 metal complex.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Inert condensing agent (ICA). An inert liquid useful for cooling materials in the polymerization reactor(s) (e.g., a fluidized bed reactor). In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$) alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %.

Lower molecular weight (LMW). Relative to HMW, having a lower weight average molecular weight ($M_w$). The LMW polyethylene component of the inventive bimodal LMDPE composition may have an $M_w$ from 3,000 to 100,000 g/mol. The lower endpoint of the $M_w$ for the LMW polyethylene component may be 5,000, alternatively 8,000, alternatively 10,000, alternatively 12,000, alternatively 15,000, alternatively 20,000 g/mol. The upper endpoint of $M_w$ may be 50,000, alternatively 40,000, alternatively 35,000, alternatively 30,000 g/mol. The LMW polyethylene component may be made with catalyst prepared by activating a metallocene ligand-Group 4 metal complex.

Polyethylene. A macromolecule, or collection of macromolecules, composed of repeat units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such repeat units are derived from ethylene monomer, and, in aspects wherein there are less than 100 mol % ethylenic repeat units, the remaining repeat units are comonomeric units derived from at least one ($C_3$-$C_{20}$)alpha-olefin; or collection of such macromolecules. Linear medium density polyethylene (LMDPE). The macromolecule having a substantially linear structure.

Procatalyst. Also referred to as a precatalyst or catalyst compound (as opposed to active catalyst compound), generally a material, compound, or combination of compounds that exhibits no or extremely low polymerization activity (e.g., catalyst efficiency may be from 0 or <1,000) in the absence of an activator, but upon activation with an activator yields a catalyst that shows at least 10 times greater catalyst efficiency than that, if any, of the procatalyst.

Resolved (GPC chromatogram). A molecular weight distribution having two peaks separated by an intervening local minimum. For example, a resolved GPC chromatogram of the inventive polymers represented by a plot of dW/dlog (MW) versus log(MW) that features local maxima dW/dlog (MW) values for the LMW and HMW polyethylene component peaks, and a local minimum dW/dlog(MW) value at a log(MW) between the maxima. The at least some separation of the peaks for the LMW and HMW polyethylene components in the chromatogram of the GPC. Typically the separation may not be down to baseline.

Start-up or restart of the polymerization reactor(s) illustrated with a fluidized bed reactor. The start-up of a recommissioned fluidized bed reactor (cold start) or restart of a transitioning fluidized bed reactor (warm start/transition) includes a time period that is prior to reaching the (co) polymerizing conditions. Start-up or restart may include the use of a seedbed preloaded or loaded, respectively, into the fluidized bed reactor. The seedbed may be composed of powder of polyethylene. The polyethylene of the seedbed may be a MDPE, alternatively a LMDPE, alternatively a bimodal LMDPE, alternatively a previously made embodiment of the inventive bimodal LMDPE composition.

Start-up or restart of the fluidized bed reactor may also include gas atmosphere transitions comprising purging air or other unwanted gas(es) from the reactor with a dry (anhydrous) inert purge gas, followed by purging the dry inert purge gas from the reactor with dry ethylene gas. The dry inert purge gas may consist essentially of molecular nitrogen ($N_2$), argon, helium, or a mixture of any two or more thereof. When not in operation, prior to start-up (cold start), the fluidized bed reactor contains an atmosphere of air. The dry inert purge gas may be used to sweep the air from a recommissioned fluidized bed reactor during early stages of start-up to give a fluidized bed reactor having an atmosphere consisting of the dry inert purge gas. Prior to restart (e.g., after a change in seedbeds or prior to a change in alpha-olefin comonomer), a transitioning fluidized bed reactor may contain an atmosphere of unwanted alpha-olefin, unwanted ICA or other unwanted gas or vapor. The dry inert purge gas may be used to sweep the unwanted vapor or gas from the transitioning fluidized bed reactor during early stages of restart to give the fluidized bed reactor having an atmosphere consisting of the dry inert purge gas. Any dry inert purge gas may itself be swept from the fluidized bed reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the fluidized bed reactor to the reaction temperature of the (co)polymerizing conditions.

Start-up or restart of the fluidized bed reactor also includes introducing feeds of reactants and reagents thereinto. The reactants include the ethylene and the alpha-olefin.

The reagents fed into the fluidized bed reactor include the molecular hydrogen gas and the inert condensing agent (ICA) and the mixture of the bimodal catalyst system and the trim solution.

Substance or article in need of covering. A naturally occurring or man-made material, or manufactured article that would benefit from having a layer of the inventive bimodal LMDPE composition thereover, therearound, or thereon. Substances in need of covering include those vulnerable to their external environments and those in need of segregation therefrom. External environments may contain oxygen, moisture, and/or light, which may degrade such substances but for the layer of the inventive bimodal LMDPE composition. Such substances include clothing, drugs, food, electronic components, hygroscopic compounds, plants, and any other light, oxygen and/or moisture-sensitive material or manufactured article. Articles in need of covering include ordered arrangements of materials (e.g., stacks of manufactured articles on a pallet in need of wrapping), boxes in need of shrink wrapping, loose manufactured articles in need of shipping, and toxic or corrosive materials.

Trim solution. Any one of the metallocene procatalyst compounds or the non-metallocene procatalyst compounds described earlier dissolved in the inert liquid solvent (e.g., liquid alkane). The trim solution is mixed with the bimodal catalyst system to make the mixture, and the mixture is used in the inventive polymerization reaction to modify at least one property of the inventive bimodal LMDPE composition made thereby. Examples of such at least one property are density, melt index MI2, flow index FI21, melt flow ratio, and molecular mass dispersity ($M_w/M_n$), $Ð_M$. The mixture of the bimodal catalyst system and the trim solution may be fed into the polymerization reactor(s) in "wet mode", alternatively may be devolatilized and fed in "dry mode". The dry mode is fed in the form of a dry powder or granules. When mixture contains a solid support, the wet mode is fed in the form of a suspension or slurry. In some aspects the inert liquid is a liquid alkane such as heptane.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator. The activator may be an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

Advantageously we discovered the inventive bimodal LMDPE. It unpredictably has at least one improved property such as, for example, at least one improved (increased) processability property and/or at least one improved (increased) stiffness property. The improved processability property may be at least one of decreased extruder barrel pressure, increased sealability (e.g., hot seal/hot tack), decreased tan delta value, and increased shear thinning index value. The improved stiffness property may be at least one of increased Elmendorf tear (CD Tear and/or MD Tear), increased melt strength, and increased dart impact strength. In some aspects the inventive bimodal LMDPE is not characterized by a worsening of any three, alternatively any two, alternatively any one of the foregoing properties. In some aspects the inventive bimodal LMDPE is not characterized by a worsening of any three, alternatively any two, alternatively any one of the foregoing properties.

Test samples of embodiments of unfilled and filled compositions may be separately made into compression molded plaques. The mechanical properties of these compositions may be characterized using test samples cut from the compression molded plaques.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pa., USA. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional (ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Bimodality Test Method: determine presence or absence of resolved bimodality by plotting dWf/dLogM (mass detector response) on y-axis versus LogM on the x-axis to obtain a GPC chromatogram curve containing local maxima log (MW) values for LMW and HMW polyethylene component peaks, and observing the presence or absence of a local minimum between the LMW and HMW polyethylene component peaks. The dWf is change in weight fraction, dLogM is also referred to as dLog(MW) and is change in logarithm of molecular weight, and LogM is also referred to as Log(MW) and is logarithm of molecular weight.

Dart Impact Test Method: measured according to ASTM D1709-16a, Standard Test Methods for Impact Resistance of Plastic Film by the Free-Falling Dart Test Method, Method A. Method A employs a dart with a 38.10±0.13-mm (1,500±0.005-in.) diameter hemispherical head dropped from a height of 0.66±0.01 m (26.0±0.4 in.). This test method can be used for films whose impact resistances require masses of about 50 g or less to about 6 kg to fracture them. Results expressed in grams (g).

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the inventive bimodal LMDPE composition by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density Test Method: measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm³).

Elmendorf Tear Test Method: measured according to ASTM D1922-09, Standard Test Methods for Propagation Tear Resistance of Plastic Film and Thin Sheeting by Pendulum Method, Type B (constant radius). (Technically equivalent to ISO 6383-2.) Report results as normalized tear in cross direction (CD) or machine direction (MD) in gram-force (gf).

Flow Index (190° C., 21.6 kg, "$FI_{21}$") Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kg, "$FR_5$") Test Method: use ASTM D1238-13, using conditions of 190° C./5.0 kg. Report results in units of grams eluted per 10 minutes (g/10 min.) or the equivalent in decigrams per 1.0 minute (dg/1 min.).

Flow Rate Ratio: (190° C., "$FI_{21}/FI_5$") Test Method: calculated by dividing the value from the Flow Index $FI_{21}$ Test Method by the value from the Flow Index $FI_5$ Test Method.

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: $c = K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

Long Chain Branching (LCB) Test Method: calculate number of long chain branches (LCB) per 1,000 carbon atoms of a test polymer using a correlation developed by Janzen and Colby (*J. Mol. Struct.*, 485/486, 569-584 (1999)) between zero shear viscosity, $\eta_o$, and $M_w$. Their correlation is drawn as a reference line on a reference graph of $\eta_o$ on the y-axis and $M_w$ on the x-axis. Then a test polymer is characterized by (a) and (b): (a) using the Zero Shear Viscosity Determination Method described later, measuring the test polymer's small-strain (10%) oscillatory shear, and using a three parameter Carreau-Yasuda empirical model ("CY Model") to determine values for $\eta_o$ therefrom; and (b) using the GPC Test Method described earlier, measuring the test polymer's $M_w$. Plot the results for the test polymer's $\eta_o$ and $M_w$ on the reference graph, and compare them to the reference line. Results for test polymers with zero (0) long chain branching per 1,000 carbon atoms will plot below the Janzen and Colby reference line, whereas results for test polymers having long chain branching >0 per 1,000 carbon atoms will plot above the Janzen and Colby reference line. The CY Model is well-known from R. B. Bird, R. C. Armstrong, & O. Hasseger, *Dynamics of Polymeric Liquids, Volume 1, Fluid Mechanics*, 2$^{nd}$ Edition, John Wiley & Sons, 1987; C. A. Hieber & H. H. Chiang, *Rheol. Acta*, 1989, 28: 321; and C. A. Hieber & H. H. Chiang, *Polym. Eng. Sci.*, 1992, 32: 931.

Melt Flow Ratio (190° C., "$MI_{21}/MI_2$") Test Method: calculated by dividing the value from the Flow Index $FI_{21}$ Test Method by the value from the Melt Index $MI_2$ Test Method.

Melt Index (190° C., 2.16 kilograms (kg), "$MI_2$") Test Method: for ethylene-based (co)polymer is measured according to ASTM D1238-13, using conditions of 190° C./2.16 kg, formerly known as "Condition E" and also known as $MI_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Shear Thinning Index (SHI) Test Method: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). Obtain a SHI value by calculating the complex viscosities at given values of complex modulus, and calculating the ratio of the two viscosities. For example, using the values of complex modulus of 1 kilopascal (kPa) and 100 kPa, obtain the $\eta^*(1.0$ kPa$)$ and $\eta^*(100$ kPa$)$ at a constant value of complex modulus of 1.0 kPa and 100 kPa, respectively. The shear thinning index SHI(1/100) is defined as the ratio of the two viscosities $\eta^*(1.0$ kPa$)$ and $\eta^*(100$ kPa$)$, i.e. $\eta^*(1.0)/\eta^*(100)$.

Tan Delta Test Method: a dynamic mechanical analysis (DMA) method measured at 190° C. and 0.1000 radians per second (rad/s) using the following procedure: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). A tan delta ($\delta$) at a particular frequency ($\omega$) is defined as the ratio of loss modulus (G") to storage modulus (G') obtained at that frequency ($\omega$), i.e. tan $\delta$=G"/G'. The tan $\delta$ value at frequency ($\omega$) 0.1 radian/second is used later in Table 2.

Tensile Modulus Test Method: measured according to ASTM D882-12, *Standard Test Methods for Tensile Properties of Thin Plastic Sheeting*. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Zero Shear Viscosity Determination Method: perform small-strain (10%) oscillatory shear measurements on polymer melts at 190° C. using an ARES-G2 Advanced Rheometric Expansion System, from TA Instruments, with parallel-plate geometry to obtain complex viscosity |$\eta^*$| versus frequency ($\omega$) data. Determine values for the three parameters-zero shear viscosity, $\eta_o$, characteristic viscous relaxation time, $\tau_\eta$, and the breadth parameter, a,-by curve fitting the obtained data using the following CY Model:

$$|\eta^*(\omega)| = \frac{\eta^\circ}{[1+(\tau_\eta \omega)^a]^{\frac{(1-n)}{a}}},$$

wherein |$\eta^*(\omega)$| is magnitude of complex viscosity, $\eta_o$ is zero shear viscosity, $\omega$ is viscous relaxation time, a is the breadth parameter, n is power law index, and w is angular frequency of oscillatory shear.

Bimodal catalyst system 1: consisted essentially of or made from bis(2-pentamethylphenylamido)ethyl)amine zirconium dibenzyl and (tetramethylcyclopentadienyl)(n-propylcyclopentadienyl)zirconium dichloride spray-dried in a 3:1 molar ratio onto CAB-O-SIL TS610, a hydrophobic fumed silica made by surface treating hydrophilic (untreated) fumed silica with dimethyldichlorosilane support, and methylaluminoxane (MAO), and fed into a gas phase polymerization reactor as a slurry in mineral oil. The molar ratio of moles MAO to (moles of bis(2-pentamethylphenylamido)ethyl)amine zirconium dibenzyl+moles (tetramethylcyclopentadienyl)(n-propylcyclopentadienyl)zirconium dichloride) was 140:1.

Comonomer 1: 1-Hexene, used at a molar ratio of 1-hexene/C2 in Table 1.

Ethylene ("C2"): partial pressure of C2 was maintained as described later in Table 1.

Inert condensing agent 1 ("ICA1"): isopentane, used at a mole percent (mol %) concentration in the gas phase of a gas phase reactor relative to the total molar content of gas phase matter. Reported later in Table 1.

Molecular hydrogen gas ("H2"): used at a molar ratio of H2/C2 in Table 1.

Trim solution 1: consisted essentially of or made from (tetramethylcyclopentadienyl)(n-propylcyclopentadienyl) zirconium dimethyl (procatalyst) dissolved in heptane to give a solution having a concentration of 0.7 gram procatalyst per milliliter solution (g/mL).

Comparative Example 1 (CE1): medium density polyethylene (MDPE) resin as product XHS-7071 NT 7 from The Dow Chemical Company. See Table 2 for properties.

Inventive Examples 1 and 2 (IE1 & IE2): Produced the bimodal LMDPE composition of IE1 in a single gas phase polymerization reactor containing a pilot plant scale continuous mode, gas phase fluidized bed reactor with a capacity of producing 22 to 110 kg resin per hour. For an experimental run, preloaded the reactor before startup with a seedbed of granular resin inside. Dried down the reactor with the seedbed below 5 ppm moisture with high purity nitrogen. Then introduced reaction constituent gases to the reactor to build a gas phase condition. At the same time heated the reactor up to the desired temperature. Charged the reactor with hydrogen gas sufficient to produce a molar ratio of hydrogen to ethylene of 0.006 at the reaction conditions, and charged the reactor with 1-hexene to produce a molar ratio of 1-hexene to ethylene of 0.011 at reaction conditions. Pressurized the reactor with ethylene (total pressure=220 psi) and kept the temperature at 105° C. Once the (co) polymerizing conditions were reached, injected a feed of a slurry of Bimodal Catalyst System1 into the reactor. Meanwhile mixed a trim solution feed with the feed of Bimodal Catalyst System1 to give a mixture thereof, which is then fed into the reactor, wherein mixing was done at varying molar ratios ranging from 1.5 to 2.0 ($Zr_{catalyst}/Zr_{trim}$, mol/mol) to fine tune flow index and melt index of inventive bimodal polyethylene composition to desired target values. Used about three bed turnovers to reach steady-state production of the bimodal polyethylene, thereby giving the embodiment of the inventive bimodal LMDPE (product) of IE1. Collected the inventive bimodal LMDPE of IE1 from the reactor's product discharge outlet and characterized its properties. Operating constituents and parameters are summarized below in Table 1. Properties of the product inventive bimodal LMDPE of IE1 are summarized later in Table 2. For making another embodiment of inventive bimodal LMDPE composition wherein density is from 0.930 to 0.945 g/cm³, replicate the procedure except increase the molar ratio of 1-hexene/C2 from 0.011 to a range from 0.010 to 0.040.

TABLE 1

Operating constituents/parameters for IE1 and IE2.

| Reaction Constituent/Parameter | IE1 | IE2 |
|---|---|---|
| Reactor | single, continuous-mode, fluidized bed | single, continuous-mode, fluidized bed |
| Starting seedbed = granular LDPE resin | Preloaded in reactor | Preloaded in reactor |
| Reactor Purging method | Anhydrous $N_2$ gas | Preloaded in reactor |
| Ethylene ("C2") | 1517 kPa partial pressure | 1517 kPa partial pressure |
| Comonomer = 1-hexene | molar ratio of 1-hexene/C2 = 0.011 | molar ratio of 1-hexene/C2 = 0.020 |
| Molecular hydrogen gas ("H2") | molar ratio of H2/C2 = 0.006 | molar ratio of H2/C2 = 0.006 |
| Inert Condensing Agent 1: isopentane | 9.0 mol % | 7.5 mol % |
| Bimodal Catalyst System 1/C2 (wt/wt) | 1:2470 (22.1 wt % catalyst solid in mineral oil) | 1:4268 (23.1 wt % catalyst solid in mineral oil) |
| Trim Solution 1/C2 (wt/wt) | 1:265 | 1:4113 |
| Operating temperature | 105° C. | 95° C. |
| Bed weight | 50 kg | 43.1 kg |
| Superficial gas velocity (SGV, meters/second) | 0.60 | 0.55 |

TABLE 2 properties of inventive bimodal LMDPE of IE1.

| Polymer Property Measured | IE1 | IE2 | CE1 |
|---|---|---|---|
| Density (ASTM D792-13) | 0.9478 g/cm$^3$ | 0.9375 g/cm$^3$ | 0.936 g/cm$^3$ |
| Melt Index MI$_2$ (190° C., 2.16 kg, ASTM D1238-04) | 0.24 g/10 min. | 0.23 g/10 min. | 0.32 g/10 min. |
| Flow Index FI$_{21}$ (190° C., 21.6 kg, ASTM D1238-04) | 17 g/10 min. | 19 g/10 min. | 30 g/10 min. |
| Melt Flow Ratio (MI$_{21}$/M$_2$) | 70 | 83 | 94 |
| Flow Rate FR$_5$ (190° C., 5.0 kg, ASTM D1238-04) | 0.82 | 0.81 | N/R* |
| Flow Rate Ratio (FI$_{21}$/FR$_5$) | 20.7 | 24 | N/R |
| Composition Number-average molecular weight (M$_n$) | 8,347 g/mol | 13,648 | 10,930 |
| Composition Weight-average molecular weight (M$_w$) | 204,720 g/mol | 186,648 | 187,930 |
| Composition Molecular mass dispersity (M$_w$/M$_n$), Đ$_M$ | 24.53 | 13.68 | 17.19 |
| Resolved Bimodality (GPC local minimum) | Yes, at 4.54 LogM | Yes, at 4.6 LogM | None |
| LMW Polyethylene Component Concentration (wt %) | 55.7 | 37.3 | NMF** |
| HMW Polyethylene Component Concentration (wt %) | 44.3 | 62.7 | NMF |
| LMW Polyethylene Component M$_n$ (g/mol) | 3,900 | 5,235 | NMF |
| HMW Polyethylene Component M$_n$ (g/mol) | 90,043 | 68,642 | NMF |
| LMW Polyethylene Component M$_w$ (g/mol) | 10,921 | 11,151 | NMF |
| HMW Polyethylene Component M$_w$ (g/mol) | 359,026 | 288,976 | NMF |
| Long Chain Branching (LCB) Index | No LCB detected | No LCB detected | Unknown |
| Tan delta at 0.1000 radian per second | 3.17 | 3.17 | 1.43 |
| Shear Thinning Index (1/100) (SHI) | 7.2 | N/R | N/R |

*N/R not reported;
**NMF = not meaningful.

In some aspects the inventive bimodal LMDPE is characterized by any one of the properties listed in Table 2, wherein the property is defined by a range having a midpoint equal to the property value listed in Table 2 and maximum and minimum endpoints equal to, respectively, plus-or-minus (±) 55%, alternatively ±25%, alternatively ±15%, alternatively ±11%, alternatively ±5%. The expected resolved bimodality for IE1 is illustrated by the chromatogram in FIG. 2, wherein the peak for the LMW polyethylene component is at approximately 4.1 LogM, the peak for the HMW polyethylene component is at approximately 5.2 LogM, and the local minimum is at approximately 4.54 LogM. The chromatogram in FIG. 2 reaches baseline at approximately 2.1 LogM and approximately 6.9 LogM.

Inventive Examples (A) and (B): Preparation of a 25 micrometers thick, monolayer film of the inventive bimodal LMDPE of IE1 or IE2. A blown-film-line machine is configured for making polyethylene films with a feed hopper in fluid communication with an extruder in heating communication with a heating device heated to a temperature of 430° C. The extruder is in fluid communication with a die having a fixed die gap of 1.778 millimeter (70.00 mils), a blow up ratio of 2.5:1. The Frost Line Height (FLH) is 84±3 centimeters (33±1 inches) from the die. The machine uses a feed rate of inventive bimodal LMDPE, and achieves a production rate of film, of 90.3 kg (199.1 pounds) per hour at a melt temperature of 204°±1° C. and an extruder rate of 30.3 revolutions per minute (rpm) to give films of IE(A) and IE(B), respectively. Measure dart impact, Elmendorf tear, and tensile properties on the films of IE(A) and IE(B). Results are reported later in Table 3.

Comparative Example (A) (CE(A)): make a comparative film in the same manner as in IE(A) from the LDPE of CE1 to give a film of CE(A).

TABLE 3 properties of inventive films of IE(A) and IE(B).

| Polymer Property Measured | IE(A) | IE(B) | CE(A) |
|---|---|---|---|
| Dart Impact, average dart weight | <40 g | 136 g | <40 g |
| Elmendorf Tear (CD, gf) | 1318 | 1296 | 1371 |
| Elmendorf Tear (MD, gf) | 30 | 90 | 23 |
| Secant Modulus (1%, CD, MPa) | 1396 | 698 | 772 |
| Secant Modulus (1%, MD, MPa) | 886 | 570 | 632 |
| Secant Modulus (2%, CD, MPa) | 1100 | 572 | 639 |
| Secant Modulus (2%, MD, MPa) | 723 | 477 | 542 |
| Tensile Strength, CD avg. strain at yield | 3.86% | 6.3 | 5.12% |
| Tensile Strength, CD avg. stress at yield (MPa) | 30.7 | 22.5 | 21.6 |
| Tensile Strength, MD avg. strain at yield | 6.4% | 7.2 | 8.6% |
| Tensile Strength, MD avg. stress at yield (MPa) | 25.7 | 18.5 | 18.5 |

The inventive bimodal LMDPE can be made into a film and the inventive bimodal LMDPE and film thereof has at least one improved property such as, for example, at least one improved (increased) processability property and/or at least one improved (increased) stiffness property. The improved processability property may be at least one of decreased extruder barrel pressure, increased sealability (e.g., hot seal/hot tack), decreased tan delta value, and increased shear thinning index value. The improved stiffness property may be at least one of increased Elmendorf tear (CD Tear and/or MD Tear), increased melt strength, and increased dart impact strength. In some aspects the inventive bimodal LMDPE is not characterized by a worsening of any three, alternatively any two, alternatively any one of the foregoing properties. In some aspects the inventive bimodal LMDPE is not characterized by a worsening of any three, alternatively any two, alternatively any one of the foregoing properties.

The inventive film IE(A) is made from higher density resin than that of the comparative CE(A) film, and yet surprisingly the inventive film has higher MD tear. The inventive IE(A) film also possesses significantly higher secant modulus in MD and CD and higher tensile strength than those of the comparative CE(A) film. Although the inventive IE(B) film and the comparative CE(A) film are made from resins with comparable densities, surprisingly the inventive IE(B) film has significantly higher dart impact strength and higher MD tear than those of the comparative CE(A) film.

The invention claimed is:

1. A bimodal linear medium density polyethylene composition comprising a lower molecular weight (LMW) polyethylene component and a higher molecular weight (HMW) polyethylene component, wherein each of the LMW and HMW polyethylene components comprises ethylene-derived monomeric units and ($C_3$-$C_{20}$)alpha-olefin-derived comonomeric units; and wherein the bimodal linear medium density polyethylene composition is characterized by each of limitations (a) to (d): (a) a resolved bimodality showing in a chromatogram of gel permeation chromatography (GPC) of the bimodal linear medium density polyethylene composition, wherein the chromatogram shows a peak representing the HMW polyethylene component, a peak representing the LMW polyethylene component, and a resolved bimodal molecular weight distribution characterized by a local minimum in a range of Log(molecular weight) ("Log (MW)") 1.5 to 5.0 between the peak representing the HMW polyethylene component and the peak representing the LMW polyethylene component, measured according to Bimodality Test Method; (b) a molecular mass dispersity ($M_w/M_n$), $Đ_M$, from 5 to 30.1, measured according to Gel Permeation Chromatography (GPC) Test Method; (c) no measurable amount of long chain branching per 1,000 carbon atoms ("LCB Index"), measured according to LCB Test Method; and (d) a density from 0.930 to 0.950 gram per cubic centimeter (g/cm$^3$), measured according to ASTM D792-13 Method B.

2. The bimodal linear medium density polyethylene composition of claim 1 described by any one of limitations (i) to (iii): (i) a melt index (190° C., 2.16 kilograms (kg), "$MI_2$") from 0.1 to 5.0 grams per 10 minutes (g/10 min), measured according to Melt Index $MI_2$ Test Method; (ii) a tan delta (tan δ) from 5 to 35, measured at 190° C. and 0.1000 radians per second (rad/s) according to Tan Delta Test Method; (iii) both (i) and (ii).

3. The bimodal linear medium density polyethylene composition of claim 1 described by any one of limitations (i) to (iii): (i) a melt index (190° C., 2.16 kilograms (kg), "$MI_2$") from 0.1 to 5.0 grams per 10 minutes (g/10 min), measured according to Melt Index $MI_2$ Test Method; (ii) a molecular mass dispersity ($M_w/M_n$), $Đ_M$, of at least one of the LMW and HMW polyethylene components of from >2.0 to <3.0, measured according to the GPC Test Method after deconvoluting the LMW and HMW polyethylene components of the bimodal linear medium density polyethylene composition according to Deconvoluting Test Method; (iii) both (i) and (ii).

4. The bimodal linear medium density polyethylene composition of claim 1 described by any one of limitations (i) to (xii): (i) a flow index (190° C., 21.6 kg, "$FI_{21}$") from 4 to 500 g/10 min, measured according to the Flow Index $FI_{21}$ Test Method; (ii) a melt flow ratio (190° C., "$MI_{21}/MI_2$") 20.0 to 50.0, calculated according to the Melt Flow Ratio Test Method; (iii) a shear thinning index value from 1.5 to 10, measured according to the Shear Thinning Index Test Method; (iv) a number-average molecular weight ($M_n$) from 5,000 to 25,000 grams per mole (g/mol) measured according to GPC Test Method; (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

5. The bimodal linear medium density polyethylene composition of claim 1 described by any one of limitations (i) to (iv): (i) the ($C_3$-$C_{20}$)alpha-olefin-derived comonomeric units are derived from 1-butene; (ii) the ($C_3$-$C_{20}$)alpha-olefin-derived comonomeric units are derived from 1-hexene; (iii) the ($C_3$-$C_{20}$)alpha-olefin-derived comonomeric units are derived from 1-octene; and (iv) the (C$_3$-C$_{20}$)alpha-olefin-derived comonomeric units are derived from a combination of any two of 1-butene, 1-hexene, and 1-octene.

6. A manufactured article comprising a shaped form of the bimodal linear medium density polyethylene composition of claim 1.

7. The manufactured article of claim 6 selected from the group consisting of coatings, films, sheets, extruded articles, and injection molded articles.

8. The manufactured article of claim 6 selected from the group consisting of a coated metal pipe, agricultural film, food packaging, garment bags, grocery bags, heavy-duty sacks, industrial sheeting, pallet and shrink wraps, bags, buckets, freezer containers, lids, and toys.

9. The manufactured article of claim 6 comprising a coated steel pipe.

10. A bimodal linear medium density polyethylene composition made by copolymerizing ethylene (monomer) and at least one (C$_3$-C$_{20}$)alpha-olefin (comonomer) with a mixture of a bimodal catalyst system and a trim solution in the presence of molecular hydrogen gas (H$_2$) and an inert condensing agent (ICA) in a polymerization reactor under (co)polymerizing conditions; wherein prior to being mixed together the trim solution consists essentially of a (tetramethylcyclopentadienyl)(n-propylcyclopentadienyl)zirconium complex and an inert liquid solvent and the bimodal catalyst system consists essentially of an activator species, a bis(2-pentamethylphenylamido)ethyl)amine zirconium complex and a (tetramethylcyclopentadienyl)(n-propylcyclopentadienyl)zirconium complex, all disposed on a solid support; and wherein the (co)polymerizing conditions comprise a reaction temperature from 80° C. to 110° C., a molar ratio of the molecular hydrogen gas to the ethylene (H2/C2 molar ratio) from 0.001 to 0.050; and a molar ratio of the comonomer to the ethylene (Comonomer/C2 molar ratio) from 0.005 to 0.10.

11. A method of making a bimodal linear medium density polyethylene composition, the method comprising contacting ethylene and at least one (C$_3$-C$_{20}$)alpha-olefin with a mixture of a bimodal catalyst system and a trim solution in the presence of H$_2$ gas and an inert condensing agent in a polymerization reactor under (co)polymerizing conditions, thereby making the bimodal linear medium density polyethylene composition; wherein prior to being mixed together the trim solution consists essentially of a (tetramethylcyclopentadienyl)(n-propylcyclopentadienyl)zirconium complex and an inert liquid solvent and the bimodal catalyst system consists essentially of an activator species, a non-metallocene ligand-Group 4 metal complex and a metallocene ligand-Group 4 metal complex, all disposed on a solid support; and wherein the (co)polymerizing conditions comprise a reaction temperature from 80° C. to 110° C. a molar ratio of molecular hydrogen gas to the ethylene from 0.001 to 0.050; and a molar ratio of comonomer to the ethylene from 0.005 to 0.10.

12. The bimodal linear medium density polyethylene composition of claim 10 described by of any one of limitations (i) to (vi): (i) wherein the bimodal catalyst system consists essentially of a bis(2-pentamethylphenylamido)ethyl)amine zirconium complex and a (tetramethylcyclopentadienyl)(n-propylcyclopentadienyl)zirconium complex in a molar ratio thereof from 1.0:1.0 to 5.0:1.0, respectively, and a methylaluminoxane species, all disposed by spray-drying onto the solid support; (ii) wherein the bimodal catalyst system further consists essentially of mineral oil and the solid support is a hydrophobic fumed silica; (iii) wherein the mixture is a suspension of the bimodal catalyst system in mineral oil and the trim solution and the mixture is premade and then fed into the polymerization reactor; (iv) wherein the trim solution is made by dissolving (tetramethylcyclopentadienyl)(n-propylcyclopentadienyl)zirconium dimethyl in the inert liquid solvent to give the trim solution; (v) wherein the polymerization reactor is one fluidized bed gas phase reactor; and (vi) each of (i) to (v).

\* \* \* \* \*